Oct. 25, 1966 R. FIEHN 3,281,854
RECORDING APPARATUS FOR VEHICLES
Filed April 24, 1964 4 Sheets-Sheet 1

INVENTOR
Raimar Fiehn
by Michael J. Striker

Oct. 25, 1966  R. FIEHN  3,281,854
RECORDING APPARATUS FOR VEHICLES

Filed April 24, 1964  4 Sheets-Sheet 2

INVENTOR
Raimar Fiehn
by Michael J. Striker
Atty

Oct. 25, 1966  R. FIEHN  3,281,854
RECORDING APPARATUS FOR VEHICLES
Filed April 24, 1964  4 Sheets-Sheet 3

INVENTOR
Raimar Fiehn
by Michael J. Striker

United States Patent Office 3,281,854
Patented Oct. 25, 1966

3,281,854
RECORDING APPARATUS FOR VEHICLES
Raimar Fiehn, Konigsfeld, Black Forest, Germany, assignor to Kienzle Apparate G.m.b.H., Black Forest, Germany
Filed Apr. 24, 1964, Ser. No. 362,421
Claims priority, application Germany, Apr. 26, 1963, K 49,589, K 49,590
30 Claims. (Cl. 346—18)

The present invention relates to assemblies adapted to be used with land vehicles for recording information such as the speed of the vehicle, the distance it travels, and the periods when the vehicle is operated.

Although recording devices of this general type are indeed well known, they have been used up to the present time with relatively large land vehicles, such as trucks, omnibuses, and the like, which have been used for commercial purposes. By incorporating such a device into a vehicle it is possible to determine how the vehicle has been operated so that in this way supervision can be maintained over the vehicle operators. These known devices are generally mounted on the dashboard of the truck or the like and have a tiltable cover which includes the support for the recording sheet and the marking pens and when the cover is closed the device has an indicator which is visible so as to perform the functions of a tachometer and clock, enabling a separate tachometer and a separate clock to be eliminated. However, these known structures while suitable for use with large heavy commercial vehicles cannot be used with smaller passenger vehicles purchased by private citizens for pleasure purposes. The dashboards of such smaller passenger vehicles cannot accommodate the conventional recording devices of the above type while it might be conceivable that such a recording device could be mounted, for example, beneath the dash between the latter and the tunnel for the torque tube, as a practical matter nobody would so mount the known structure because of the inconveniences which would be involved not only in mounting the recording device, but also in the sacrifice of available space in the interior of the vehicle.

Nevertheless, there is, and has been for several years, a real need for a recording device of the above type in private non-commercial passenger vehicles, and up to the present time this need has not been satisfied.

It is accordingly a primary object of the present invention to provide a recording device of the type referred to above which can be conveniently incorporated into a non-commercial type of land vehicle, such as a conventional automobile.

In particular, it is an object of the invention to provide a recording device of this type which can be conveniently mounted on the dashboard of such a vehicle.

Furthermore, it is an object of the invention to provide a recording device of the above type which will enable in such a private passenger vehicle the use of a separate clock and tachometer also to be eliminated.

In particular, it is an object of the invention to provide a recording device which is of such a size and configuration that it can, for example, be mounted on the dashboard of a conventional automobile in the space which is normally occupied by the radio of the vehicle.

Furthermore, the objects of the invention include the provision of a recording device of the above type which is capable of orienting a recording sheet so that it will be properly positioned with respect to the time of day.

In addition, it is an object of the invention to provide a recording device which will permit unobstructed insertion of a recording sheet into the recording device.

Furthermore, it is an object of the invention to provide a recording device which will protect the parts against injury if, for example, the device is operated without a recording sheet.

With the above objects in view, the invention includes, in an assembly to be used with land vehicles for recording information such as speed, distance travelled, and periods of use, a housing which is of a relatively flat configuration enabling it to be conveniently mounted on the dashboard of a conventional automobile, this housing having at its front wall a slot through which a recording sheet can be introduced into the housing. The housing carries in its interior a rotary supporting disc which is adapted to carry the supporting sheet, and this disc can be exposed at a front peripheral portion at the front of the housing in the slot through which the sheet is introduced, and the periphery of the disc can carry indicia which will indicate the time of day, this disc being driven by a clockwork, so that the use of a conventional clock can be eliminated. The structure of the invention also includes a means for properly orienting a sheet which is introduced into the housing so that it will have on the supporting disc an angular position which will accurately record the information with respect to the time of day.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1b is a front elevation of the structure of FIG. 1a;

FIG. 2a is a schematic top plan view of another possible embodiment of a structure according to the invention;

FIG. 2b is a front elevation of the structure of FIG. 2a;

FIG. 2c is a side elevation of the structure of FIG. 2b;

FIG. 3 is an exploded perspective view of a further embodiment of a recording device according to the invention FIG. 4a is a schematic top plan view of a further embodiment of a recording device according to the invention;

FIG. 4b is a front elevation of the structure of FIG. 4a;

FIG. 4c is a side elevation of the structure of FIG. 4b;

FIG. 8b is a schematic representation of a stage in the operation subsequent to that of FIG. 8a;

FIG. 8c illustrates a still further stage in the operation, the operation illustrated in FIG. 8c taking place subsequent to that illustrated in FIG. 8b;

FIG. 11a is a perspective illustration of a structure for orienting a recording sheet;

FIG. 11b is a perspective illustration of another embodiment of part of the structure of FIG. 11a.

Figure 1A:
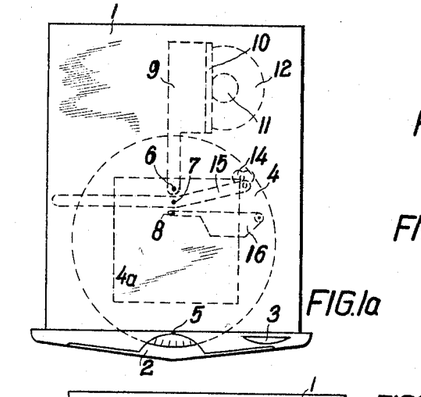
FIG. 1a is a schematic top plan view of one possible embodiment of a recording device according to the present invention.
Figure 1B:
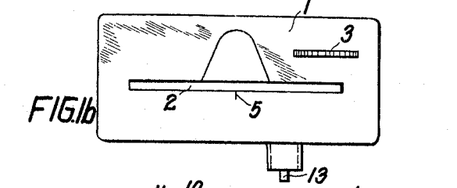
Figure 1C:
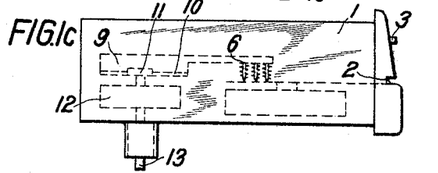
FIG. 1c is a side elevation of the structure of FIG. 1b.

Referring now to FIGS. 1a–1c, it may be seen that the recording structure illustrated therein includes a housing 1 which is almost entirely closed and which is relatively flat, which is to say, it has a relatively small height in comparison to its depth and width, the depth being its dimension from front to rear. The housing is provided at its front wall with an elongated horizontal slot 2 through which a recording sheet can be introduced into the housing, and in addition, there is accessible at the front wall a manually operable member 3 for the purpose of orienting a recording sheet properly with respect to the time of day, assuming that such an orienting device is present in the assembly. A recording sheet is adapted to be carried by a rotary sheet supporting disc 4 which is located in a horizontal plane and supported for rotation about a vertical axis, and a suitable clockwork 4a is operatively connected to the disc 4 to rotate the latter so that, for example, the disc 4 will turn through a single revolution in 24 hours. Naturally, if desired, the structure could be arranged so that the disc 4 turns through a single revolution in 12 hours. The disc 4 is adapted to support a circular recording sheet centrally arranged on the disc 4 and of a smaller diameter than the latter so that a peripheral portion of the disc 4 surrounds and is located beyond the circular recording sheet, and the front of this peripheral portion of the disc 4 projects into the slot 2 and is visible at the front of the housing 1, as is particularly apparent from FIG. 1a. Along its periphery, which is thus exposed, the disc 4 carries indicia indicating the time of day, and this indicia cooperates with a stationary index 5 located on the front wall of the housing at the exterior thereof, so that in the restricted area which is indicated in FIG. 1a at the central upper front part of the housing there will be an indication of the time of day. Thus, with this construction it is possible to introduce the recording sheet, to properly orient it with respect to the time of day, and to indicate the time of day to the operator. These time indicia preferably extend through 24 hours for a single revolution of the disc 4.

The recording structure includes markers 6, 7, 8 for recording the information on the recording sheet, and these markers can take the form of suitable recording pens, for example. These markers will record the information on the time coordinates printed on the recording sheet, and a particular time coordinate is displaced precisely by 180° with respect to the identical time indication visible at the front of the housing in alignment with the index 5, so that with such an arrangement in order to accurately provide the information it is necessary to orient the recording sheet so that at its part which is directly opposed to the index 5 the time coordinate will be the same as the particular time of day visible at the periphery of the disc 4 in alignment with the index 5.

The marker 6 records the speed of movement of the vehicle and is carried by a recording carriage 9 supported for linear movement in a forward and rearward direction, this carriage 9 fixedly carrying a rack 10 which meshes with a pinion 11 coaxially fixed to and driven by an eddy current measuring assembly 12. This eddy current measuring assembly 12 is arranged in the housing so that the magnet shaft for connecting the eddy current structure 12 to the drive shaft extends downwardly through the bottom wall of the housing 1. Through an unillustrated transmission, the magnet shaft 13 drives a cam 14 of cardioid configuration, and a cam follower, carried by a lever 15, engages the cardioid cam 14 so as to turn the lever 15 and thus move the marker 7, carried thereby, this marker also being in the form of a recording pen, for example. The marker 7 will record the distance travelled. It describes in a known way a zig-zag curve including a series of teeth and the distance occupied by each toothed portion of the zig-zag curve corresponds to a predetermined travelled distance. In addition, the structure includes a vibratory pendulum 16 which will vibrate whenever the vehicle is used, which is to say, when its engine is running, and this vibratory pendulum 16 carries a marker 8 also in the form of a suitable recording pen, so that the marker 8 will record on the recording sheet the periods when the vehicle is used.

Figures 2A, 2B, 2C, 3, 4A, 4B, 4C:
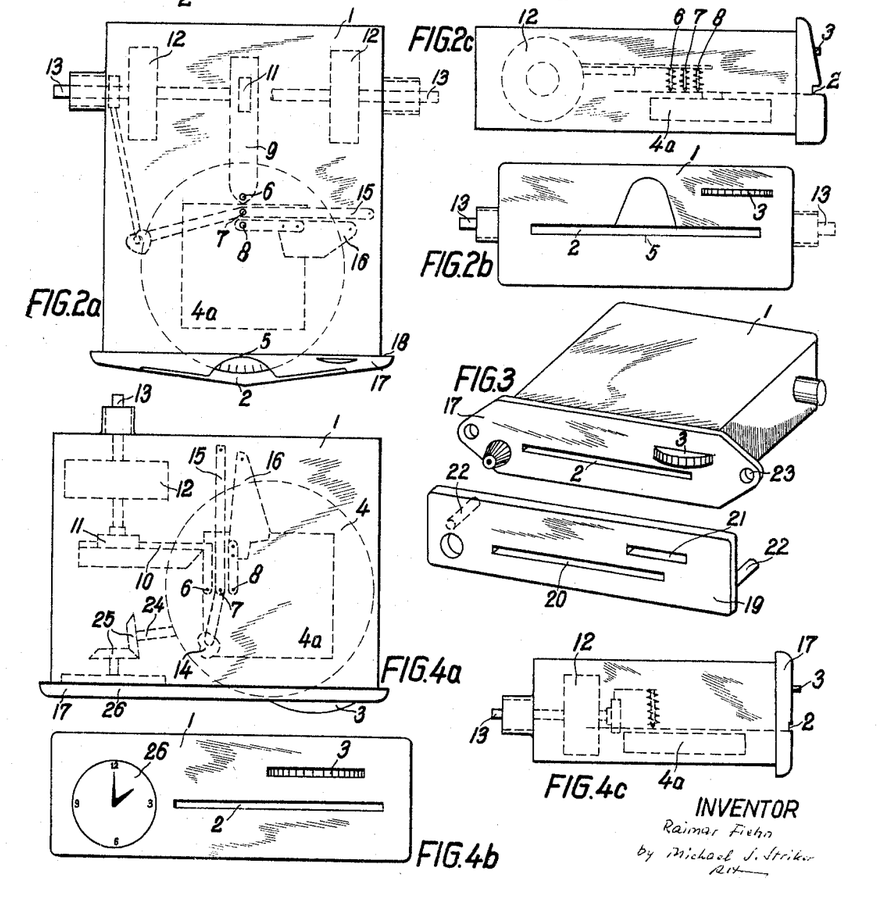

FIGS. 2a–2c show another embodiment which corresponds generally in all respects to the above-described embodiment of FIGS. 1a–1c, the difference being that in the embodiment of FIGS. 2a–2c the eddy current type of measuring structure 12 is horizontally arranged, rather than vertically, and the magnet shaft with this embodiment can extend either to the right or to the left through a side wall of the housing to be connected to a suitable transmission, as described above. The choice of whether to use the arrangement of FIGS. 1a–1c or that of FIGS. 2a–2c will vary from case to case. It depends, of course, on the space which happens to be available in a particular vehicle for accommodating the structure of the invention.

The housing 1 of the device is constructed in such a way that the front wall 17 has a flange 18 enabling the housing to be attached to a suitable support. For example, the housing 1 may be inserted through an opening in the dashboard with the flange 18 engaging the front face of the dashboard and attached to the dashboard.

Instead of providing a front wall 17 with a flange 18, as shown in FIGS. 1a–2c, it is also possible to provide the structure of FIG. 3 which differs from the above embodiments in that the wall 17 again has a rear surface adapted to engage the front surface of the dashboard but is covered by a suitable covering element 19 formed with openings 20 and 21 respectively aligned with the slot 2 and the manually operable element 3 which passes through the slot 21, so as to be accessible to the operator, the slot 20 simply forming an extension of the slot 2. The cover 19 fixedly carries rearwardly extending threaded studs 22 adapted to pass through the openings 23 and suitably aligned openings of the dashboard to receive at the rear of the dashboard suitable nuts which enable the assembly to be fixed to the dashboard, and in this way the cover 19 is also fixed to the front of the wall 17.

FIGS. 4a–4c illustrate a further embodiment which corresponds generally to that of FIGS. 1a–1c and 2a–2c, the embodiment of FIGS. 4a–4c providing, however, the possibility of giving the housing a configuration where its depth, from front to rear, is less than its width, from side to side. In FIGS. 1a–2c it will be noted that the depth of the housing is greater than its width. With the housing configuration as shown in FIGS. 4a–4c the measuring structure and the sheet supporting disc 4 can be arranged beside each other, and in addition, a time indicating assembly 26 is provided. The clockwork 4a transmits its motion through a shaft 24 and a pair of bevel gears 25 to the time indicating assembly 26 which is visible at the front wall of the housing. As is apparent from FIG. 4a, in this embodiment the markers 6–8 are so arranged that they cooperate with a time coordinate of the recording sheet which is angularly displaced with respect to an index on the slot 2 which corresponds to the index 5 by only 90° rather than 180°. Therefore, with this embodiment when the recording sheet is introduced it has to be oriented by having its time coordinates displaced by 90° with respect to the time indicated at the front of the housing, whereas with the embodiments of FIGS. 1a–2c this displacement is 180°. Inasmuch as it may be rather difficult to provide manually a precise 90° displacement between the orientation of the recording sheet and the time which is visible at the front of the housing, the embodiment of FIGS. 4a–4c should be provided with a structure which will automatically provide in a precise manner the proper orientation of the recording sheet.

Figure 5:
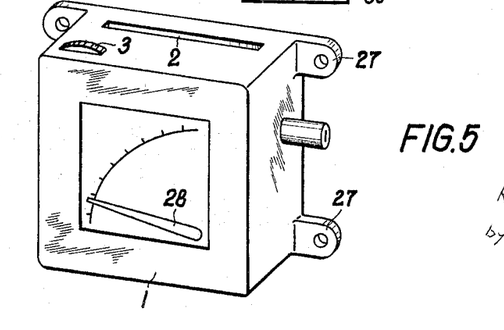
FIG. 5 is a perspective illustration of still another possible embodiment of a structure according to the present invention.

The embodiment of the invention which is diagrammatically illustrated in FIG. 5 also includes a housing which is enclosed at all sides, but this embodiment does not have a front wall by which it can be attached to a suitable support. Instead it is the rear wall of the housing 1 of FIG. 5 which carries apertured ears 27 which enable the assembly to be mounted on a suitable instrument panel or the like. In this embodiment the slot 2 through which the recording sheet is introduced is located in the top wall of the housing, and the element 3 which is manipulated to orient the recording sheet is accessible at the top of the housing 1. The housing 1 of FIG. 5 makes it possible to situate at its visible front wall a speed-indicating device 28.

Figure 6:
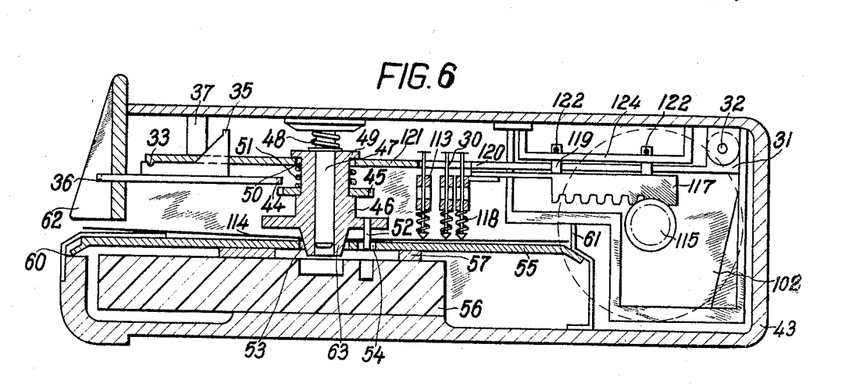
FIG. 6 is a longitudinal sectional side elevation showing the details of one possible embodiment of a recording structure according to the invention.
Figure 7:
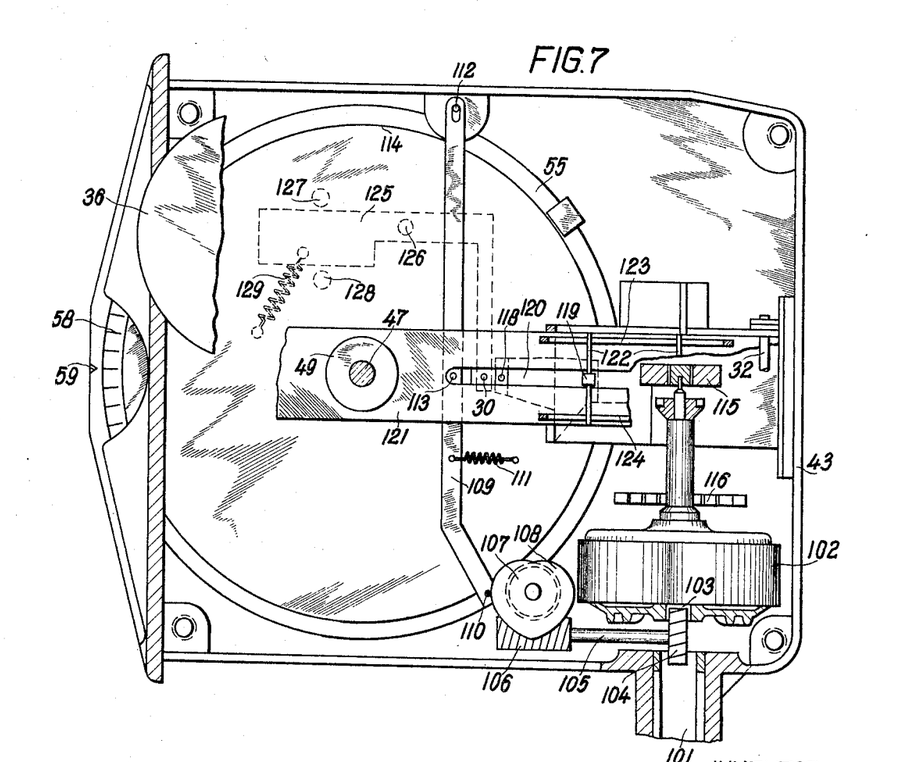
FIG. 7 is a top plan view of the structure of FIG. 6 with the top wall of the housing removed so as to clearly illustrate the structure beneath the top wall, parts of FIG. 7 also being illustrated in section to more clearly disclose the structure of the invention.

FIGS. 6 and 7 show in greater detail the structure in the interior of the housing. Referring to FIGS. 6 and 7 the drive shaft 101 for the eddy current magnet system 102 extends through a side of the housing. The magnet shaft 103 fixedly carries an unillustrated worm wheel which drives a worm 104 fixed to a shaft 105 for rotating the latter, as indicated at the lower part of FIG. 7, and also fixed to the shaft 105 is a second worm 106 which thus rotates with the shaft 105. This worm 106 meshes with a worm wheel 107 fixed coaxially to the cardioid cam 108 so as to rotate the latter and this cam 108 of course corresponds to the cam 14 shown in FIG. 1a. The cardioid cam 108 is engaged by a follower 110 carried by a lever 109 which corresponds to the lever 15 of FIG. 1a, and a spring 111 urges the lever 109 to turn in a counterclockwise direction, as viewed in FIG. 7, about the pivotal support 112 for the lever 109, so that in this way the follower pin 110 is maintained in engagement with the periphery of the cam 108. The lever 109 carries the marker 113 in the form of a suitable recording pen corresponding to the marker 7 referred to above, and in this way the marker 113 will record on the recording sheet 114, which is shown in FIGS. 6 and 7, the distance that the vehicle has travelled.

From the eddy current bell of the eddy current system 102 a small gear 115 is adjusted in accordance with the speed of movement of the vehicle. The eddy current bell is urged to its zero position by a spring 116, but is angularly turned in a known way by rotation of the magnets beyond its zero position. Thus, the gear 115 is also correspondingly angularly displaced from its zero position to an angular position which corresponds to the speed of travel of the vehicle. The gear 115 transmits its rotary movement to a rack 117 (FIG. 6) which carries the marker 118 in the form of a marking pen corresponding to the marker 6 of FIG. 1a. Thus, the marker 118 will record on the sheet 114 the speed of the vehicle. The rack 117 fixedly carries a pair of upwardly directed extensions 119 which pass through a slot 120 extending longitudinally of an elongated lever 121, and above the lever 121 the extensions 119 carry cross members 122, respectively, which thus extend laterally beyond the slot 120 at an elevation higher than the lever 121. These cross members 122 engage the upper surfaces of elongated horizontal portions of a pair of parallel supports 123 and 124 each of which has at the ends of its horizontal portion a pair of upwardly directed portions fixed to the underside of the top wall of the housing, so that in this way the cross members 122 slide along the stationary supports 123 and 124 during longitudinal movement of the rack 117 in response to rotation of the gear 115.

Furthermore, the structure includes the vibratory pendulum 125 (shown in dotted lines in FIG. 7), this pendulum corresponding to the pendulum 16 of FIG. 1a. The pendulum 125 is supported for rotary movement by a stationary pivot member 126 and extends between a pair of stationary stops 127 and 128. A spring 129 urges the pendulum 125 in a counterclockwise direction, as viewed in FIG. 7, and under the influence of the spring 129 the pendulum 125 will in a known way swing between the stops 127 and 128 due to the vibrations of the vehicle when it is used. The pendulum 125 carries the marker 30 in the form of a recording pen corresponding to the marker 8 of FIG. 1a, and this maraker 30 extends through the slot 120 of the lever 121. The marker 30 is thus guided in the slot 120 of the lever 121. In the same way the markers 118 and 113 also extend through and are guided by the slot 120 of the lever 121. For the sake of clarity the lever 109 and the pendulum 125 are omitted from FIG. 6.

Figures 11A, 11B:
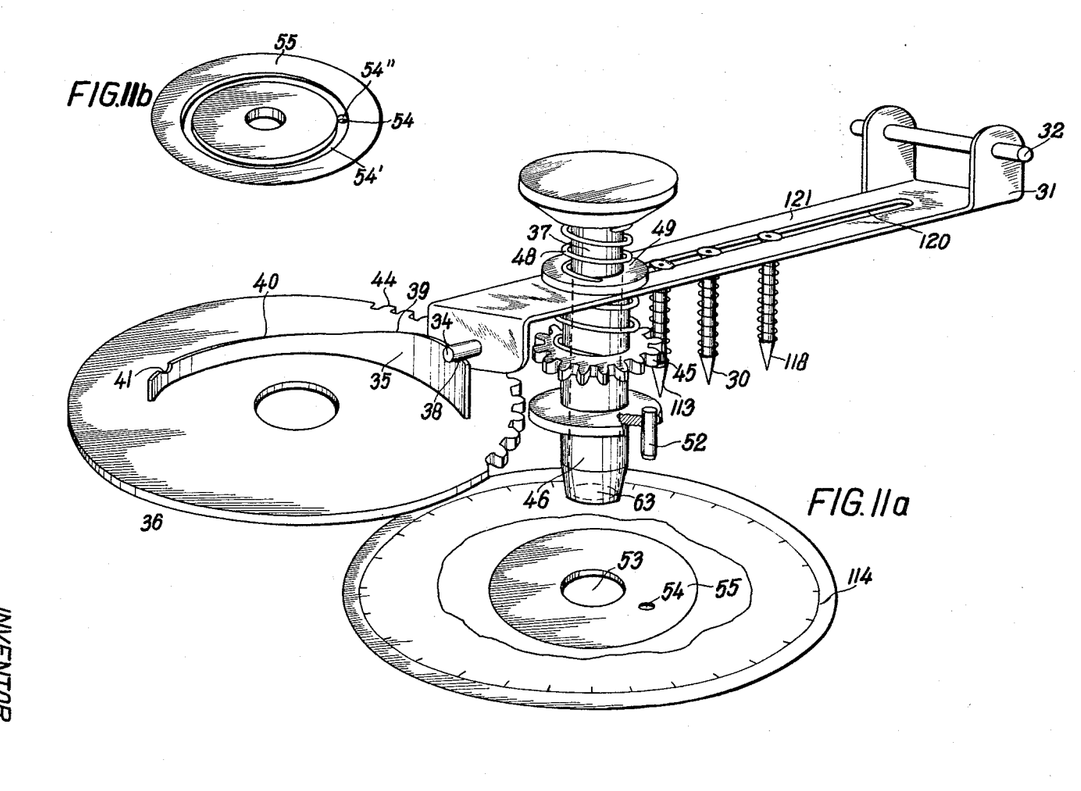

The lever 121 forms part of the structure of the invention for introducing the recording sheet. This lever 121 carries at its right end, as viewed in FIGS. 6 and 7, a pair of upwardly directed ears 31 formed with aligned apertures through which a stationary pivot shaft 32 extends, this shaft 32 being fixedly carried by a bracket which is fixed to the rear wall 43 of the housing so that in this way the lever 121 is supported for turning movement about the axis of the pivot shaft 32. At its front end the lever 121 carries a projection 33 which in FIG. 11a is in the form of a pin 34. By means of this projection 33 or 34 the lever 121 cooperates with a cam 35 which is fixedly carried by the rotary disc 36 which extends through a slot in the front wall of the housing to the exterior thereof so as to be accessible to the operator, this disc 36 corresponding to the manually operable element 3 referred to above. The disc 36 is supported for rotary movement by a stationary shaft 37 fixed to and extending downwardly from the top wall of the housing and carrying any suitable collars or the like which prevent axial movement of the disc 36 relative to the shaft 37 while at the same time the disc 36 is free to turn relative to the shaft 37.

The cam 35 is provided at its upper portion with a depression 38 (FIG. 8a) and with an inclined camming portion 39 extending downwardly from the depression 38 to a horizontal camming portion 40 which leads to a second, lower depression 41 of the cam 35. A spring 42 (FIG. 8a) acts on the lever 121 to urge the latter to turn about the pivot 32 in a counterclockwise direction, as viewed in FIG. 8a, so that in this way the projection 33 is maintained in engagement with the camming edge of the cam 35. The manually operable disc 36, which fixedly carries the cam 35, is provided at its peripheral portion which extends outwardly beyond the front wall of the housing with a knurled periphery facilitating the turning of the disc by the operator, while at its inner peripheral portion the disc 36 is provided with the teeth 44 which are adapted to mesh with a gear 45 which is supported for free rotary movement by a coupling sleeve 46. As is apparent from FIG. 6 the gear 45 rests on an upwardly directed shoulder of the sleeve 46. This sleeve 46 is itself guided for rotary movement by a stationary shaft 47 which extends into a bore of the sleeve 46 and which is fixed to and extends downwardly from the top wall of the housing, and a spring 48 is coiled about the pin 47 and presses with its top end against a fitting fixing the pin 47 to the housing and its bottom end against the top end of the sleeve 46 so as to urge the latter downwardly. The sleeve 46 has an outwardly directed flange 49 at its top end, and just below the flange 49 the sleeve 46 extends through an opening 50 of the lever 121, this opening 50 having a smaller diameter than the outer diameter of the flange 49, so that in this way when the lever 121 is elevated, in a manner described below, the upper surface of the lever 121 will engage the flange 49 to raise the sleeve 46. A spring 51 is coiled about the sleeve 46, bears with its upper end against the flange 49, and bears with its lower end against the gear 45 so that this spring 51 serves as a friction clutch between the sleeve 46 and the gear 45 enabling the rotary movement of the gear 45 to be transmitted to the sleeve 46 when the teeth 44 of the disc 36 mesh with the gear 45 and the disc 36 is manually turned.

The sleeve 46 has a tapered lower end 63 and is provided just above its tapered end 63 with an outwardly directed flange fixedly carrying an eccentric pin 52. The rotary disc 55 corresponds to the disc 4 referred to above and serves to support the recording sheet 114, and this disc 55 is formed with a central opening 53 adapeted to receive the tapered end 63 of the sleeve 46 and with an eccentric opening 54 located at the same radical distance from the center of the disc 55 that the pin 52 is located from the axis of the pin 47, so that this pin 52 is adapted to be received in the eccentric opening 54 of the disc 55. The disc 55 is driven by a clockwork 56 of conventional construction, the drive being transmitted from the clockwork 56 to the disc 55 by a transmission 57 which, for example, may include a pinion driven by the clockwork and an internal ring gear fixed to the underside of the disc 55 and having its teeth in mesh with the pinion. In this way the disc 55 will be turned at a rate which corresponds to the passage of time. The disc 55 carries at its outer periphery indicia 58 indicating the time of day, and the indicia 58 cooperate with an index 59 located at the front of the housing so as to be visible with a portion of the indicia 58, as is apparent from FIG. 7.

A cover 60 of Plexiglas or the like covers at least the front portion of the disc 55 and thus prevents access to the disc 55 so that it is not possible to manipulate the disc 55. When the recording sheet 114 is introduced into the housing, it engages in its fully inserted position a stationary stop member 61.

Referring now to FIGS. 8a–8c and 11a, the operations which are performed during the insertion of a recording sheet 114 will be described. FIG. 11a shows the parts in the position they take when the follower pin 34 (or the follower projection 33) is in the upper depression 38 of the cam 35. At this time the lever 121 is necessarily elevated, and its upper surface has not only raised the sleeve 46 by engaging the flange 49 thereof, but in addition the upper surface of the lever 121 has engaged discs respectively carried by the markers 113, 118 and 30 at their upper ends, so that all of the markers as well as the sleeve 46 (and of course, the eccentric pin 52 therewith) are raised at this time above the disc 55 by a distance sufficient to afford unobstructed movement of the sheet 114 along the disc 55 across the upper face thereof until the peripheral edge of the sheet 114 engages the stop 61. Thus, all the operator need do at this time is to introduce the sheet 114 through the slot 62, which corresponds to the slot 2 referred to above, and there will be no obstructions in its path.

Figures 8A, 9, 10B:
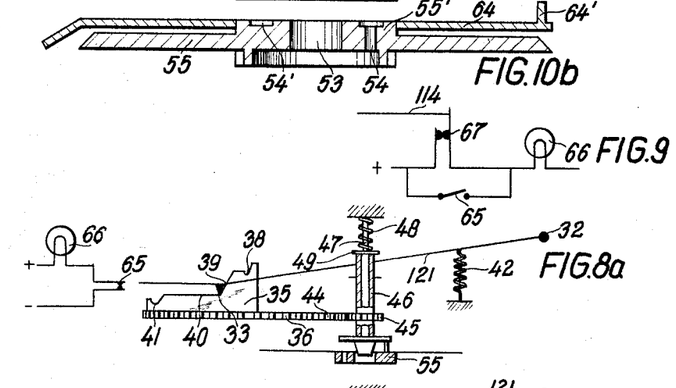
FIG. 8a is a diagrammatic representation of one stage in the operation of the structure of FIGS. 6 and 7.
FIG. 9 schematically represents a different wiring circuit for a lamp used with the structure of the invention.
FIG. 10b is a transverse sectional view of yet another embodiment of a sheet supporting assembly according to the invention.
Figures 8B, 8C:
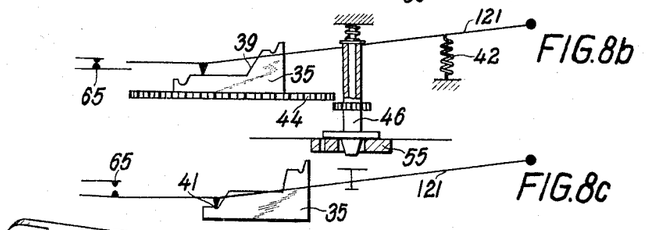

When the sheet 114 has been introduced in this way until it engages the stop 61, the operator turns the disc 36 so as to displace the upper depression 38 beyond the pin 34 (or the projection 33) and now the inclined edge 39 of the cam 35 moves along the cam follower (33 or 34) so that the lever 121 will gradually swing down until the cam follower reaches the horizontal camming portion 40. The result is that the markers 113, 118 and 30, as well as the coupling sleeve 46 are all lowered. The recording sheet 114 has a central opening which before lowering of the sleeve 46 is at least in approximate alignment with the central opening 53 of the disc 55, and in addition, the sheet 114 has an eccentric opening which is adapted to be aligned with the opening 54. Therefore, the lowering of the coupling sleeve 46 will cause the tapered lower end 63 thereof to enter into the central opening of the sheet 114 and thus guarantee that the sheet 114 is centrally aligned with the disc 55. However, it is quite unlikely that the eccentric opening of the sheet 114 is aligned initially with the opening 54, so that the pin 52 will only engage the top surface of the sheet 114. The lowering of the sleeve 46 from its uppermost position has located the gear 45 in the plane of the disc 36 so that the teeth 44 of the disc 36 mesh with the gear 45 during the lowering of the lever 121, resulting from the turning of the disc 36 by the operator, and the result is that the rotation of the disc 36 is transmitted to the gear 45 which through the spring 51 rotates the sleeve 46, with the result that the pin 52 slides along the upper surface of the sheet 114 until the pin 52 "finds" the eccentric opening of the sheet 114. The parts are so designed that the frictional engagement between the disc 55 and the sheet 114 is much greater than the frictional engagement between the pin 52 and the sheet 114, so that there is no possibility of the sheet 114 turning with the pin 52 and the sleeve 46. To achieve this the pin 52 is provided with a slightly rounded point, which easily slides on the smooth paper surface of sheet 114, while disc 55 is provided with a rough surface. As soon as the pin 52 has entered into the eccentric opening of the sheet 114, the continued turning of the sleeve 46 will now result in turning of the pin 52 and the sheet 114 until the pin 52 reaches the opening 54 so as to enter into the latter, and the alignment of the eccentric opening of the sheet 114 with the eccentric opening 54 of the disc 55 guarantees precise proper orientation of the sheet 114 with respect to the disc 55 so that the time coordinates on the recording sheet 114 will coincide with those of the disc 55. At this moment the process of introducing the sheet 114 is ended. The recording sheet 114 is properly oriented with respect to time. Moreover, the entry of the eccentric pin 52 into the eccentric opening 54 produces a further downward movement of the sleeve 46 displacing the gear 45 downwardly out of mesh with the teeth 44 of the disc 36, so that further turning of the disc 36 cannot influence the coupling sleeve 46. Moreover, at the moment when the pin 52 enters the opening 54 at proper chronological position ing of the sheet 114, the markers 113, 118 and 30 also move downwardly into engagement with the recording sheet.

Figure 10A:
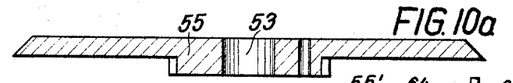
FIG. 10a shows one embodiment of a sheet supporting disc in a transverse sectional view.

FIG. 10a shows the disc 55 by itself, this disc corresponding to the disc 55 referred to above.

FIG. 10b shows a disc 55 which has a central raised portion 55′ which is the only part of the disc which engages the recording sheet 114. The remaining annular upper surface of the disc 55 of FIG. 10b surrounds the raised portion 55′ and is covered by an annular cover member 64 which takes over the function of the cover 60 referred to above and which also has a projection 64′ which takes over the function of the stop 61. The cover 64 remains stationary and will be engaged by the markers in the event that they are lowered when the operator has neglected to introduce a recording sheet into the housing. Thus, in this event the markers will only engage a stationary element and will not be placed in engagement with a rotary element which might damage the markers.

As is shown in FIGS. 10b and 11b, the central raised portion 55′ of FIG. 10b, or the central portion of the disc 55 of FIG. 11b, is formed with an annular groove 54′ coaxially surrounding the central opening of the disc 55 at the same radial distance as the eccentric opening 54, so that whenever the eccentric pin 52 finds the eccentric opening of the sheet 114 it will be received in the groove 54′ and thus facilitate the guiding of the pin 52 to the opening 54. Because of the prescence of the groove 54′, whenever the pin 52 finds the eccentric opening of the sheet 114 it will pass through this opening by a distance sufficient to guarantee turning of the sheet 114 with the pin 52, whereas if the pin 52 simply enters the eccentric opening of the sheet 114 and engages the top face of the disc 55 which is directly beneath the sheet 114 there is a possibility that the pin 52 may ride out of the eccentric opening of the sheet. It is desirable in some cases to make the base of the groove 54′ inclined with its lowermost portion located at the opening 54, so that in this way, as is indicated in FIG. 11b, the groove has a stop surface 54" aligned with one side of the opening 54 and terminating the movement of the pin 52 when it has reached the opening 54, so that there is no possibility of the pin 52 missing the opening 54.

Inasmuch as the structure in the interior of the housing is not visible to the operator, it is desirable to provide an indication which will inform the operator that the introduction of the recording sheet has been properly carried out. For this purpose, there is provided, as shown in FIGS. 8a–8c, a switch 65 located in the circuit of the lamp 66 and adapted to be actuated by the lever 121. The lamp 66 is, of course, situated so that it is visible to the operator, and when the lever 121 is in its raised position the switch 65 is closed and the lamp 66 is illuminated. This switch 64 remains closed until the projection 33 or the pin 34 reaches the lower depression 41, and when entering the lower depression 41, the lever 121 will have been lowered to an extent sufficient to engage and open the switch 65 so as to extinguish the lamp 66, and the extinguishing of the lamp 66 indicates to the operator that the sheet 114 has been properly introduced.

Of course, it is possible to turn the disc 36 when there is no sheet 114 in the housing, and it is for this purpose that the embodiment of FIG. 10b is provided as pointed out above. However, in order to prevent a false extinguishing of the lamp 66 under these conditions, the circuit of FIG. 9 can be provided. This circuit includes not only the switch 65 which is actuated by the lever 121 in the manner described above, but in addition it includes a switch 67 in parallel with the switch 65 and adapted to be opened by the sheet 114 itself only when the sheet 114 has been introduced into the housing to an extent sufficient to engage either the stop 61 or the stop 64'. Thus, if there is no sheet in the housing the switch 67 will remain closed and will maintain the lamp 66 energized even if the switch 65 is opened, and thus the circuit of FIG. 9 provides a highly reliable indication that the sheet 114 has been properly introduced into the machine.

Figure 12:
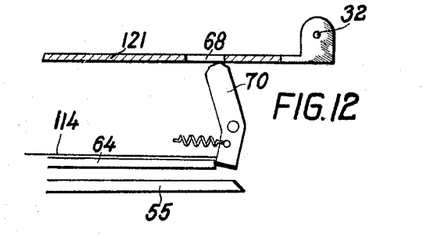
FIG. 12 is a schematic sectional elevation showing a further feature of the invention.

FIG. 12 also shows a structure which is in the nature of a safety structure guaranteeing that the above-described operations will take place only when a sheet is introduced into the housing. Referring to FIG. 12, it will be seen that a pawl 70 is pivotally mounted in the housing and is urged toward the stationary member 64 by a spring 72. The lever 121 is formed with an opening 68, and when the lever 121 is in its raised position the top end of the pawl 70 is located rearwardly of the opening 68 just beneath the lever 121. Therefore, if the operator should turn the disc 36 so as to lower the lever 121 in the manner described above, this lever 121 will only engage the upper free end of the pawl 70 and will not be able to swing down to an extent sufficient to introduce the end 63 of the sleeve 46 into the opening 53 or to place markers in engagement with the disc 55. However, when a sheet 114 is introduced its periphery will engage the pawl 70 and turn it in opposition to the spring 72 so that the top end of the pawl 70 is directly beneath opening 68 of the lever 121, so that when the lever 121 is lowered the pawl 70 will be received in the opening 68 and the operations can go forward in the manner described above only if a sheet 114 has been introduced to swing the pawl 70 to the position indicated in FIG. 12. It is to be noted that this embodiment is also of advantage since it will act to automatically eject a sheet 114. At the termination of the recordings on a given sheet, for example, after 24 hours when the disc 55 and the sheet 114 therewith have turned through a complete revolution, the operator will turn the disc 36 so as to cause the cam 35 to raise the lever 121 preparatory to removing the sheet 114 with the desired information recorded thereon. With the embodiment of FIG. 12, as soon as the lever 121 is raised beyond the pawl 70, the spring 72 will swing the pawl 70 forwardly so that it will automatically eject the sheet 114 at least to an extent sufficient to displace a peripheral portion of the sheet outwardly beyond the front end of the disc 55 to an extent sufficient to permit convenient grasping of the sheet by the operator.

On the other hand, it is also possible to use the clockwork 56 to actuate an ejector automatically when a period of time, corresponding to a single revolution of the disc 55, for example, has elapsed. This construction can take the form of a clutch connected to the ejector and the clockwork for actuating the ejector when the disc 55 has turned through a single revolution, for example. Such a clutch is, for example, engaged when a sheet 114 is introduced, for example, by turning of the pawl 70 or also by the lever 121. The ejector member will then be driven for 24 hours and will thereafter automatically bring about the disengagement of the clutch and the actuation of the pawl 70 as well as raising of the lever 121 so that sheet 114 will be automatically ejected after a single revolution.

It is to be noted that the lamp 66 also indicates to the operator, when it is illuminated, that a new recording sheet is required.

It will be understood that each of the elements described above, or two or more together, may also find a useful application in other types of recorders differing from the types described above.

While the invention has been illustrated and described as embodied in recorders in automobiles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A recording apparatus for the dashboard of an automobile, comprising, in combination, a housing adapted to be mounted behind the dashboard and being open at the same; a rotary carrier located in said housing, having a peripheral portion carrying time indicia and a surface located inside of said peripheral portion and serving for supporting and rotating a record sheet, and adapted to be driven to represent time by the angular position thereof; recording means in said housing for recording on a record sheet on said surface rotating with said carrier and adapted to be driven from a moving part of the automobile; and a front plate adapted to be mounted on the dashboard for closing said housing, said front plate having a slot through which said peripheral portion of said rotary carrier projects outwardly so as to be visible outside of said slot for indicating the time, said slot also substantially registering with said surface so that a record sheet inserted through said slot is placed on said surface for receiving a recording, and can be inserted into and removed from said housing without opening or removing said front plate.

2. A recording apparatus according to claim 1 and including a transparent cover carried by said front plate in the region of said slot for covering at least said peripheral portion of said disc projecting through said slot.

3. A recording apparatus for the dashboard of an automobile, comprising, in combination, a housing adapted to be mounted behind the dashboard and being open at the same; a rotary carrier located in said housing, having a surface for supporting and rotating a record sheet, and adapted to be driven to represent time by the angular position thereof; recording means in said housing for recording on a record sheet on said surface rotating with said carrier and adapted to be driven from a moving part of the automobile; a front plate adapted to be mounted on the dashboard for closing said housing, said front plate having a slot substantially registering with said surface so that a record sheet inserted through said slot is placed on said surface for receiving a recording, and can be inserted into and removed from said housing without opening or removing said front plate; a signal lamp; and means actuated by said rotary carrier for illuminating said signal lamp after one revolution, said one revolution representing a given period of time during which a recording is to be made on said record sheet by said recording means.

4. A recording apparatus for the dashboard of an automobile, comprising, in combination, a housing adapted to be mounted behind the dashboard and being open at the same; a rotary carrier located in said housing, having a surface for supporting and rotating a record sheet, and adapted to be driven to represent time by the angular position thereof; recording means in said housing for recording on a record sheet on said surface rotating with said carrier and adapted to be driven from a moving part of the automobile; a front plate adapted to be mounted on the dashboard for closing said housing, said front plate having a slot substantially registering with said surface so that a record sheet inserted through said slot is placed on said surface for receiving a recording, and can be inserted into and removed from said housing without opening or removing said front plate; and ejecting means arranged within said housing for automatically ejecting a record sheet supported on said surface of said carrier through said slot in said front plate after one revolution of said record carrier.

5. A recording apparatus for the dashboard of an automobile, comprising, in combination, a housing adapted to be mounted behind the dashboard and being open at the same; a rotary carrier located in said housing, having a surface for supporting and rotating a record sheet, and adapted to be driven to represent time by the angular position thereof; recording means in said housing for recording on a record sheet on said surface rotating with said carrier and adapted to be driven from a moving part of the automobile; a front plate adapted to be mounted on the dashboard for closing said housing, said front plate having a slot substantially registering with said surface so that a record sheet inserted through said slot is placed on said surface for receiving a recording, and can be inserted into and removed from said housing without opening or removing said front plate, said front plate having an opening; and means for adjusting the position of an inserted record sheet on said surface of said rotary carrier and including a manually operable member projecting out of an opening in said front plate.

6. A recording apparatus according to claim 5 wherein said adjusting means includes centering means for centering a record sheet on said carrier so that the center of the record sheet coincides with the axis of rotation of said carrier.

7. A recording apparatus according to claim 6 wherein said adjusting means includes means for changing the angular position of a centered record sheet in relation to said surface of said carrier so that a starting point of the record sheet coincides with a predetermined point of said surface of said carrier.

8. A recording apparatus according to claim 7 wherein said carrier is a rotary circular disc having a peripheral portion projecting out of said slot, said disc having peripheral indicia so that indicia on said peripheral portion are visible upon inspection of said front plate; and wherein said predetermine point of said surface is spaced 180° from an indicia on said peripheral portion indicated by an index mark on said front wall.

9. A recording apparatus for a vehicle, comprising, in combination, a housing; a rotary carrier located in said housing and having a surface for supporting a record sheet, and adapted to be driven to represent time by the angular position thereof; recording means in said housing for recording on a record sheet on said surface, and adapted to be driven from a moving part of said vehicle; centering means operable for centering a record sheet placed on said surface; first orienting means for engaging an eccentric point of the centered record sheet and for rotating the engaged record sheet so that the same slides on said surface of said carrier; and second orienting means on said carrier engaged by said first orienting means in a predetermined angular position of said first orienting means so that said eccentric point of said record sheet has the same angular position as said second orienting means whereby said record sheet then rotates with said carrier in a predetermined angular position related to time while receiving a recording from said recording means.

10. A recording apparatus according to claim 9 wherein said housing is closed; and including manually operated means located on the ouside of said closed housing and operatively connected with said centering means and first orienting means for operating the same.

11. An apparatus according to claim 10 wherein said centering means include a centering pin for engaging a central hole in the record sheet; wherein said first orienting means include an eccentric pin for engaging a corresponding eccentric hole in the record sheet; and wherein said second orienting means include an eccentric hole in said surface of said record carrier adapted to be engaged by said eccentric pin passing through said hole of said record sheet while the same slides on the rotating carrier.

12. A recording apparatus according to claim 11 wherein said manually operated means include a lever supporting said centering pin and said eccentric pin and being movable between an inoperative position and a position for placing said pins in said holes, respectively.

13. A recording apparatus according to claim 12 wherein said recording means include marking means supported on said manually operated lever and being spaced from said surface in said inoperative position and adapted to record on a record sheet in said operative position of said lever.

14. A recording apparatus according to claim 13 and including means for moving said lever from said operative position to said inoperative position when said pins are located in said holes, respectively.

15. A recording apparatus for the dashboard of an automobile, comprising, in combination, a housing adapted to be mounted behind the dashboard and being open at the same; a rotary carrier located in said housing and having a surface for supporting a record sheet and being driven to represent time by the angular position thereof; recording means in said housing for recording on a record sheet on said surface, and adapted to be driven from a moving part of the automobile; a front plate adapted to be mounted on the dashboard for closing said housing, said front plate having a slot substantially registering with said surface so that a record sheet inserted through said slot is placed on said surface and can be inserted into and removed from the housing without opening or removing said front plate; centering means operable for centering an inserted record sheet on said surface; first orienting means for engaging an eccentric point of the centered record sheet and for rotating the engaged record sheet so that the same slides on said surface of said carrier; and second orienting means on said carrier engaged by said first orienting means in a predetermined angular position of said first orienting means so that said eccentric point of said record sheet has the same angular position as said second orienting means whereby said record sheet rotates with said carrier in a predetermined angular position related to time while receiving a recording from said recording means.

16. A recording apparatus according to claim 15 and including manual means for operating said centering means and said first orienting means and being located on the outside of said front plate.

17. In an assembly for use with land vehicles to record information such as speed, distance travelled, and periods of use, in combination, a housing formed with a slot through which a recording sheet is adapted to be introduced into the housing to have information recorded thereon; an elongated lever located in said housing and pivotally supported therein for turning movement between an elevated inactive position and a lower operating position; a plurality of markers for marking information on the recording sheet, said markers being operatively connected to said lever to be maintained by the latter in an upper inoperative position when said lever is in said elevated position thereof and in a lower operating position when said lever is in said lower position thereof; and means carried by said housing for orienting a sheet introduced thereinto with respect to time of day, said latter means being operatively connected to said lever for displacing the latter to said lower position thereof only when the recording sheet has been oriented with respect to the time of day, so that said markers do not engage the sheet until the latter has been properly oriented.

18. In an assembly to be used with land vehicles for recording information such as speed, distance travelled, and periods of use, in combination, a housing formed with a slot through which a recording sheet is adapted to be introduced into said housing to have information recorded thereon; an elongated lever turnably carried by said housing in the interior thereof for movement between an upper inactive position and a lower active position; a plurality of markers carried by said lever for marking a recording sheet when said lever is in its lower active position and for being maintained by said lever at an elevation too high to record on the sheet when said lever is in said upper inactive position thereof; a centering pin for centering a recording sheet in said housing, said centering pin also being carried by said lever to be maintained thereby in an upper inoperative position when said lever is in said upper inactive position thereof and to be placed in an operative position when said lever is lowered to said lower active position thereof; a pawl turnably carried by said housing in the interior thereof and having, when there is no recording sheet in said housing, a position engaging said lever and maintaining the latter in said upper inactive position thereof, said pawl being located in the path of movement of a recording sheet into said housing to be engaged by a recording sheet and displaced by the latter to a position out of engagement with said lever releasing the latter for movement to said lower active position when a recording sheet is introduced into said housing.

19. In an assembly to be used with land vehicles for recording information such as speed, distance travelled, and periods of use, in combination, a housing formed with a slot through which a recording sheet is adapted to be introduced into said housing to have information recorded thereon; lever means mounted in said housing for movement between active and inactive positions, said lever means being operatively connected to marking devices for maintaining the latter out of engagement with a recording sheet when said lever is in said inactive position thereof and for placing said devices in engagement with a recording sheet when said lever means is in said active position thereof; means actuated by introduction of a sheet into said housing to displace said lever means from said inactive to said active position; a lamp positioned for illuminating said slot; and an electrical circuit operatively connected to said lamp for energizing the latter when said circuit is closed, said circuit being closed when said lever means is in said inactive position thereof, and said lever means automatically opening said circuit when said lever means is displaced in said active position thereof, whereby when a sheet is introduced into said housing said lamp will be extinguished while when a sheet is out of said housing said lamp will be energized to indicate to the operator that there is no sheet in said housing.

20. In an assembly adapted to be used with a land vehicle for recording information such as speed, distance travelled, and periods of use, a rotary sheet-supporting disc adapted to support a recording sheet and formed with a central opening and an eccentric opening spaced from said central opening; a centering pin coaxial with said central opening; means supporting said centering pin for axial movement into and out of said central opening of said disc and for angular movement about the common axis of said pin and disc, said centering pin fixedly carrying an eccentric pin spaced from said common axis by the same distance as said eccentric opening of said disc and turnable with said centering pin about said common axis, whereby when a recording sheet having central and eccentric openings matching those of said disc is placed between said disc and said pins, said centering pin will pass through the central opening of said sheet to center the latter with respect to said disc and then said centering pin can be turned angularly about said axis until said eccentric pin finds said eccentric opening of said sheet and then turns together with the latter until said eccentric pin enters said eccentric opening of said disc so as to angularly orient said sheet relative to said disc.

21. In an assembly adapted to be used with a land vehicle for recording information such as speeds distance travelled, and periods of use, a rotary sheet-supporting disc adapted to support a recording sheet and formed with a central opening and an eccentric opening spaced from said central opening; a centering pin coaxial with said central opening; means supporting said centering pin for axial movement into and out of said central opening of said disc and for angular movement about the common axis of said pin and disc, said centering pin fixedly carrying an eccentric pin spaced from said common axis by the same distance as said eccentric opening of said disc and turnable with said centering pin about said common axis, whereby when a recording sheet having central and eccentric openings matching those of said disc is placed between said disc and said pins, said centering pin will pass through the central opening of said sheet to center the latter with respect to said disc and then said centering pin can be turned angularly about said axis until said eccentric pin finds said eccentric opening of said sheet and then turns together with the latter until said eccentric pin enters said eccentric opening of said disc so as to angularly orient said sheet relative to said disc; and means operatively connected to said centering pin for axially displacing the latter away from said disc so that a sheet can be located between said pin and disc and for then freeing said centering pin for return movement to a position where it extends into said central opening of said disc.

22. In an assembly to be used with land vehicles for recording information such as speed, distance travelled, and periods of use, in combination, a housing having a wall formed with a pair of slots; a rotary sheet-supporting disc located in said housing for rotation therein and being aligned with one of said slots so that a recording sheet can be introduced through said one slot to be deposited on said disc for rotation therewith, and said disc having central and eccentric openings adapted to be aligned with central and eccentric openings of a recording sheet when the latter is centrally and angularly aligned with said disc; centering pin means supported in said housing coaxially with said disc for movement into and out of said central opening thereof so as to centrally align a sheet when said pin means extends through said central opening of a sheet also, said pin means including an eccentric pin at the same radial distance from the common axis of said pin means and disc as said eccentric opening of said disc and adapted to pass both through an eccentric opening of a recording sheet and into the eccentric opening of said disc for angularly aligning the recording sheet and disc; a gear supported by said pin means coaxially therewith and for rotation with respect thereto; clutch means for transmitting rotation of said gear to said pin means; and manually turnable means extending through said other slot to the exterior of said housing and having an untoothed peripheral portion located at the exterior of said housing, said manually turnable means having a toothed portion which is adapted to mesh with said gear for rotating said pin means from the exterior of said housing.

23. In an assembly to be used with land vehicles for recording information such as speed, distance travelled, and periods of use, in combination, support means; a rotary disc carried by said support means, said disc being adapted to support a recording sheet; pin means cooperating with said disc for centering and angularly aligning a recording sheet therewith; lever means carried by said support means for turning movement between an upper inactive and a lower active position, said lever means carrying said pin means for displacing the latter away from said disc when said lever means is in said upper inactive position thereof, enabling a sheet to be placed between said pin means and disc, and for advancing said pin means toward said disc to centrally and angularly align a sheet therewith; and manually operable rotary cam means carried by said support means and cooperating with said lever means for controlling the position thereof, said cam means having an upper recess adapted to be engaged by a follower portion of said lever means to locate the latter in said upper inactive position thereof, a lower recess adapted to be engaged by said follower of said lever means to locate the latter in said lower active position where said pin means has centered and angularly aligned a recording sheet with respect to said disc, and said cam means having between said upper and lower recesses thereof an inclined camming portion extending downwardly from said upper recess and an elongated horizontal camming portion extending from said inclined portion to said lower recess.

24. In an assembly as recited in claim 23, said rotary cam means having a toothed peripheral portion and said pin means supporting for rotary movement a gear which is free to rotate relative to said pin means, friction clutch means for transmitting rotation of said gear to said pin means, said inclined camming portion lowering said lever means to place said gear in mesh with said toothed portion of said cam means and said lower recess lowering said lever means to displace said gear beyond said toothed portion of said cam means, whereby rotation of said cam means while said follower portion of said lever means engages said horizontal camming portion will rotate said gear so as to rotate said pin means for angularly aligning a sheet with respect to said disc.

25. In an assembly to be used with land vehicles for recording information such as speed, distance travelled, and periods of use, in combination, support means; rotary disc means carried by said support means for rotation and adapted to carry a sheet on which information is to be recorded; pin means supported by said support means coaxially with and for rotation relative to said disc means for centrally and angularly aligning a sheet relative thereto; lever means carried by said support means for movement between active and inactive positions, said lever means carrying said pin means to displace the latter away from said disc means when said lever means is in an inactive position and for advancing said pin means toward said disc means when said lever means is moved to said active position thereof; and a plurality of markers for marking a sheet carried by said disc means to record information on said sheet, said markers being carried by said lever means to be maintained out of engagement with a sheet when said lever means is in said inactive position thereof and to be placed in engagement with a sheet when said lever means is advanced from said inactive to said active position thereof.

26. In an assembly to be used with land vehicles for recording information such as speed, distance travelled, and periods of use, in combination, rotary disc means for supporting and turning a recording sheet on which information is to be recorded, said rotary disc means having a central, raised sheet-engaging portion which is adapted to engage and turn a recording sheet and said disc means having a surface portion surrounding said raised central portion and located in a different plane than said raised central portion; and stationary cover means surrounding said raised central portion of said disc means and covering the surface thereof which surrounds said raised central portion so that a sheet which turns with said disc means will move relative to said stationary cover means, whereby markers which engage a sheet to record information thereon at a part of said sheet which moves relative to said stationary cover means will in the event there is no sheet engage only said stationary cover means so that said markers will not be engaged by any moving structure in the event that they are displaced to a marking position when there is no sheet present.

27. In an assembly to be used with land vehicles for recording information such as speed, distance travelled, and periods of use, in combination, rotary disc means for supporting a recording sheet on which information is to be recorded; lever means movable between active and inactive positions; means controlled by said lever means during movement thereof between said positions for acting on a recording sheet; lamp means; and electrical circuit means operatively connected to said lamp means for energizing the same and including a switch which is opened by said lever means when the latter is displaced with said active position thereof and which is closed by said lever means when the latter is displaced to said active position thereof and which is closed by said lever means when the latter is displaced to said inactive position thereof, so that when said lever means is in said active position and the assembly is operating, the lamp is extinguished while when the lever means is in its inactive position and the assembly is not in an operating condition, the lamp is illuminated.

28. In an assembly as recited in claim 27, second switch means connected in parallel with said first-mentioned switch means and located in the path of movement of a recording sheet to a position relative to said disc means to be rotated thereby, said second switch means being opened by a recording sheet when the latter is placed on said disc means, so that when there is no recording sheet said lamp will be illuminated even if said lever means is in said active position thereof.

29. In an assembly as recited in claim 27, means responding to movement of a recording sheet onto said disc means for preventing displacement of said lever means from said inactive to said active position thereof until a recording sheet is placed on said disc means.

30. In an assembly to be used with land vehicles for recording information such as speed, distance travelled, and periods of use, in combination, support means; rotary disc means carried by said support means for carrying a sheet on which information is to be recorded; lever means pivotally carried by said support means and extending over said disc means, said lever means being turnable between an upper inactive and a lower active position; means for acting on a sheet carried by said disc means, said means for acting on a sheet being carried by said lever means to be moved between inoperative and operative positions when said lever means is lowered from said inactive to said active position; a pawl turnably carried by said support means and having a blocking position engaging said lever means to prevent lowering thereof to said active position; spring means urging said pawl toward a peripheral edge of said disc means when said pawl is displaced to said blocking position, said pawl being located in the path of movement of a recording sheet onto said disc means to be displaced by the recording sheet when it is placed on said disc means to a nonblocking position releasing said lever means for movement from said inactive to said active position thereof, whereby when said lever means is raised from said active to said inactive position said pawl will also act on a sheet to eject the latter from said disc means.

References Cited by the Examiner

UNITED STATES PATENTS

| | | | |
|---|---|---|---|
| 1,445,214 | 2/1923 | Hollingdrake et al. | 346—137 X |
| 2,718,448 | 9/1955 | Powers | 346—18 |
| 2,905,475 | 10/1959 | Cheeseboro | 274—9.2 |
| 3,099,817 | 7/1963 | Kendall | 346—33 X |

FOREIGN PATENTS

| | | |
|---|---|---|
| 234,753 | 8/1959 | Australia. |
| 589,154 | 12/1959 | Canada. |

OTHER REFERENCES

A.P.C. application of Rodanet, Serial No. 338,695, published May 1943.

RICHARD B. WILKINSON, *Primary Examiner*.

LOUIS J. CAPOZI, *Examiner*.

JOSEPH W. HARTARY, *Assistant Examiner*.